W. T. DOREMUS.
Oscillating Chairs.
No. 134,423. Patented Dec. 31, 1872.
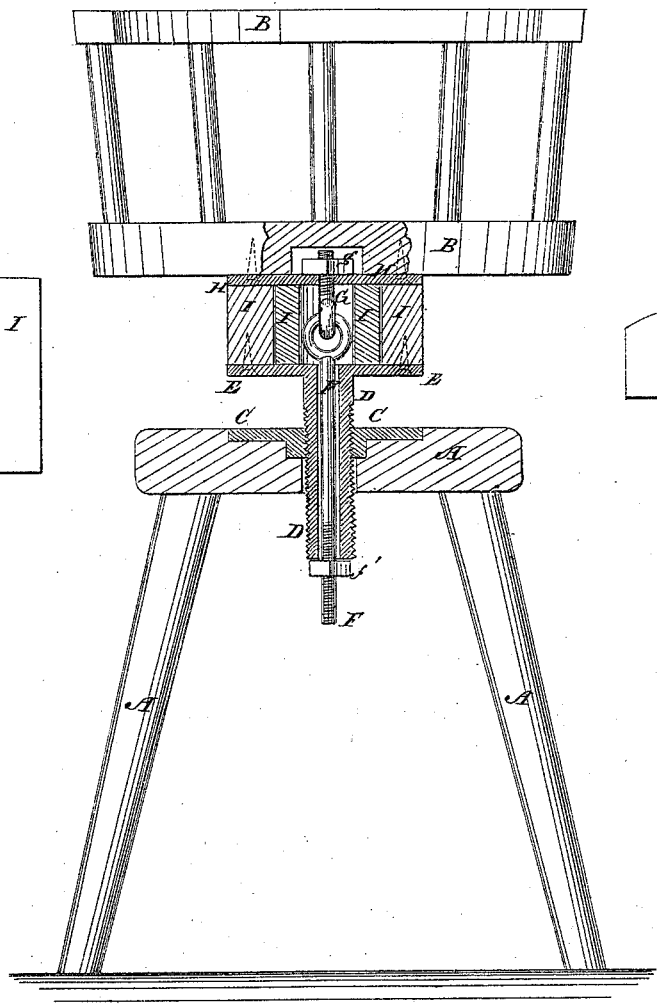

UNITED STATES PATENT OFFICE.

WILLIAM T. DOREMUS, OF NEW YORK, N. Y.

IMPROVEMENT IN OSCILLATING CHAIRS.

Specification forming part of Letters Patent No. 134,423, dated December 31, 1872.

*To all whom it may concern:*

Be it known that I, WILLIAM T. DOREMUS, of the city, county, and State of New York, have invented a new and useful Improvement in Oscillating Chairs, of which the following is a specification:

Figure 1 is a front view of my improved chair, partly in section, to show the construction. Fig. 2 is a detail top view of the rubber block. Fig. 3 is a detail side view of the same.

My invention has for its object to furnish an improved oscillating chair which shall be simple in construction, inexpensive in manufacture, strong, durable, and not liable to get out of order. The invention consists in the combination of one or more hinges and one or more rubber blocks with a pedestal and chair-seat, and in the combination of a stationary nut, hollow screw, rigid plate, hinged screws, and rubber block or blocks with each other and with the pedestal and seat of a chair, as hereinafter fully described.

A represents the pedestal, and B the chair-seat, which parts may be made of any desired form or style. C is a nut secured to the pedestal A, into the screw-thread of which fits the screw-thread formed upon the outer surface of the hollow screw D. To the upper end of the hollow screw D is securely and rigidly attached a plate, E. F is a screw, which passes through the cavity of the screw D, and has a nut, $f$, screwed upon its lower projecting end, which nut rests against the lower end of the hollow screw D, as shown in Fig. 1. To the upper end of the screw F is hinged the lower end of the screw G which passes up through the plate H attached to the chair-seat B, and is secured in place by a nut, $g$, screwed upon its upper end, and which rests against the upper side of the said plate H. I are one or more rubber blocks placed between the plates E H.

Having thus described my invention, I claim as new and desire to secure by Letters Patent—

1. The combination of one or more hinges, F G, and one or more rubber blocks, I, with a pedestal, A, and chair-seat B, substantially as herein shown and described.

2. The combination of the nut C, hollow screw D, rigid plate E, hinged screws F G, and rubber block or blocks I with each other and with the pedestal A and seat B of a chair, substantially as herein shown and described.

WILLIAM T. DOREMUS.

Witnesses:
  JAMES T. GRAHAM,
  T. B. MOSHER.